(12) United States Patent
Mori

(10) Patent No.: US 6,941,670 B1
(45) Date of Patent: Sep. 13, 2005

(54) CLUBHEAD MEASURING GAUGE

(76) Inventor: Yuji Mori, 81, Clemenceau Avenue.ue, Square #01-11, Singapore (SG) 239918

( * ) Notice: Subject to any disclaimer, the term of this patent is extended or adjusted under 35 U.S.C. 154(b) by 0 days.

(21) Appl. No.: 10/793,897

(22) Filed: Mar. 8, 2004

(51) Int. Cl.⁷ .............................................. G01B 5/24
(52) U.S. Cl. ...................................................... 33/508
(58) Field of Search .......................................... 33/508

(56) References Cited

U.S. PATENT DOCUMENTS

| | | | | |
|---|---|---|---|---|
| 4,817,294 A | * | 4/1989 | Lai ............................... | 33/508 |
| 4,858,332 A | * | 8/1989 | Thomas ....................... | 33/508 |
| 5,105,550 A | * | 4/1992 | Shenoha ...................... | 33/508 |
| 5,421,098 A | * | 6/1995 | Muldoon ...................... | 33/508 |
| 5,884,409 A | * | 3/1999 | Muldoon ...................... | 33/508 |
| 6,363,620 B1 | * | 4/2002 | Goodjohn ..................... | 33/508 |
| 6,449,860 B1 | * | 9/2002 | Nakai ........................... | 33/508 |

* cited by examiner

Primary Examiner—Christopher W. Fulton
(74) Attorney, Agent, or Firm—Troxell Law Office, PLLC

(57) ABSTRACT

A clubhead measuring gauge comprises a fixed base capable of rotating and adjusting its position along a circumference and fixing a protractor; an adjustable measuring base for mounting the protractor and allowing the protractor to shift its position in an increasing or decreasing angle; and an assistant measuring base having a standard side. All of the foregoing components are coupled to a base having a flat horizontal surface. By means of the protractor of the adjustable measuring base, the face angle of golfclubs can be adjusted to match the measuring angle of the measurement, and thus reducing the error and improving precision. Further, the fixed base is rotated to the left or right to attach the sole of the golfclub with the horizontal surface of the base for the measurement of the angles of golfclubs.

7 Claims, 12 Drawing Sheets

CLUBHEAD MEASURING GAUGE

FIELD OF THE INVENTION

The present invention relates to a measuring gauge that can improve the precision of the angles measured for clubheads (for woods or irons), and more particularly to a measuring gauge that uses an adjustable measuring base to collocate with an assistant measuring base to measure the lie angle, slope, face angle, and gravity angle of golfclubs with different specifications and sizes than can improve the precision of measurements and reduce errors.

BACKGROUND OF THE INVENTION

Most of the present methods used for measuring the angles of golfclubs generally require a tester to hold the golfclub by hand and press the striking face of the clubhead against the measuring gauge, and then the tester determines the angles of the striking face by experience and visual inspection. Such traditional methods of measuring the angles of a striking face of golfclubs can achieve the intended purpose, but the following shortcomings are still found in its practice:

1. Since all testers rely on their personal experience to measure angles of a striking face golfclub (regardless woods or irons) in longitudinal and transversal directions and such test is carried out to measure roughly by visual inspection, therefore the measurement and process are not accurate or precise.
2. Such a method takes much time and effort for the test, and may even cause defections (since the golfclub is held by hand it is not easy to it steady, therefore, errors in measuring the striking face may occur. As a result, such inaccurate methods cannot achieve the intended effect.
3. It is inevitable to have an inaccurate measurement of club angles by visual inspection. Thus, it will affect the striking effect of a golfclub in practice, or even ruin the reputation of the manufacturer.

SUMMARY OF THE INVENTION

In view of the foregoing shortcomings of the prior art, the inventor of the present invention overcame the shortcomings by developing the measuring gauge in accordance with the invention. The features and advantages of this invention are given below:

1. The invention uses an adjustable measuring base and an assistant measuring base together to measure angles such as the face angle, lie angle, gravity angle, and sole angle, etc of golfclubs to improve the precision of measurement and maintain quality standards.
2. The protractor used in the assistant measuring base of the invention can move along a circumference and align with the groove line of the striking face to improve the precision of measurement and lower the error rate.
3. The base for fixing clubheads according to the present invention adopts a screw rod as the axle center, so that the base can rotate left or right along the circumference, and the under side of the clubhead base is parallel to the horizontal base before measuring the angle in order to obtain a more accurate measurement.
4. In the measurement according to the invention, the angle measured by the protractor is adjusted to the angle of the measuring clubhead to achieve a corresponding angle measurement, and thus reduce errors.

The primary objective of the present invention is to overcome the aforementioned shortcomings by providing a clubhead measuring gauge.

DETAILED DESCRIPTION OF THE PREFERRED EMBODIMENTS

The detailed description and technical characteristics of the present invention are described together with the drawings as follows.

Figure 1:
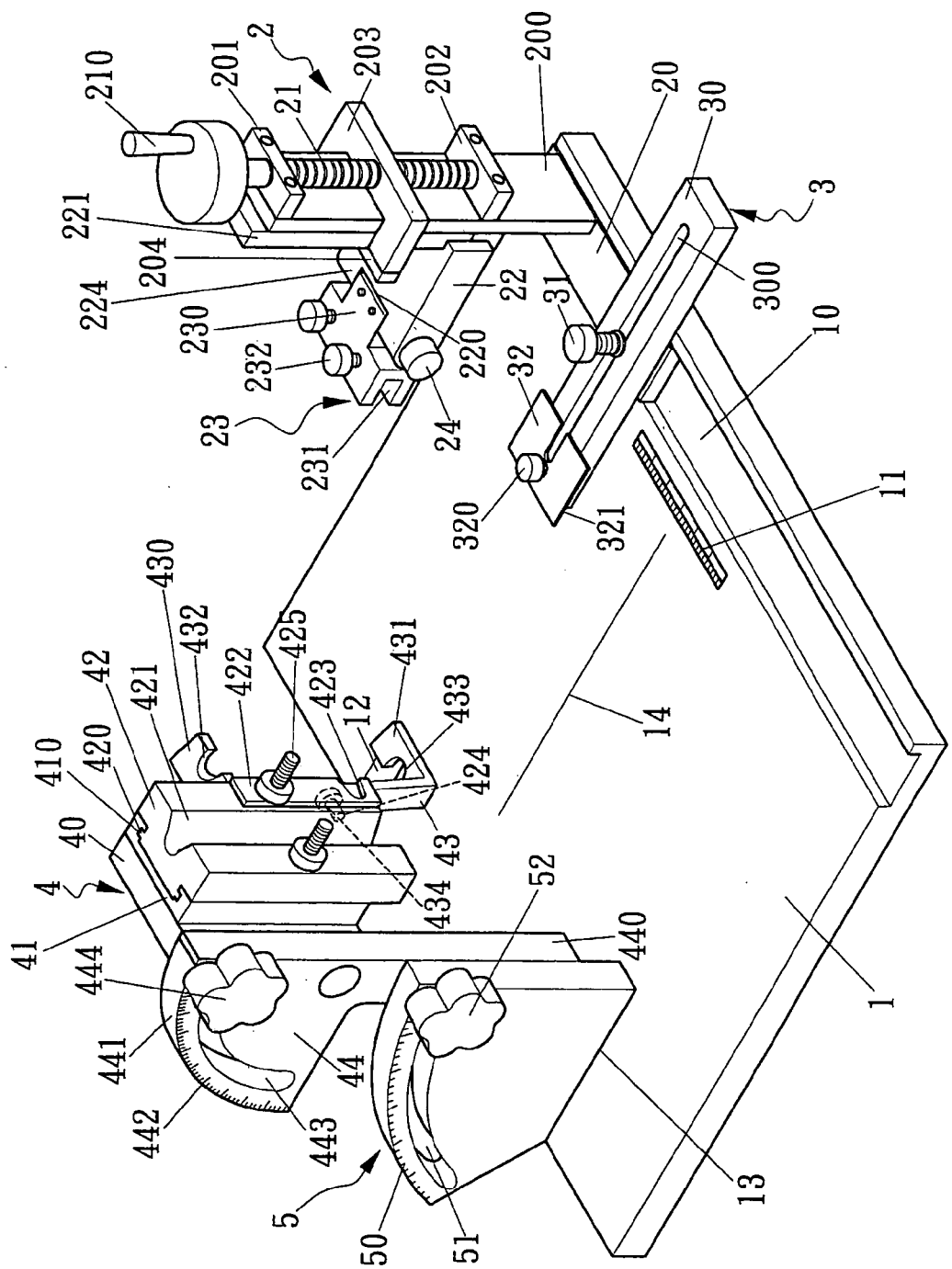
FIG. 1 is a perspective view of the assembled structure of the present invention.

Please refer to FIG. 1 for the present invention, comprising a base 1, an adjustable measuring base 2, and assistant measuring base 3, a fixed base 4, and a movable base 5; wherein the base 1 has a channel 10 on one side and two screw holes 100 (refer to FIG. 2) are disposed on one end of the channel 10 for embedding a fixed member 20 of the adjustable measuring base 2. A calibration 11 is disposed at a front end of the channel 10, and the base 1 has a concave opening 12 on the other side and an accommodating area 13 adjacent to the concave opening 12 for securing the fixed base 4 and the movable base 5 (as shown in FIG. 2).

Figure 2:
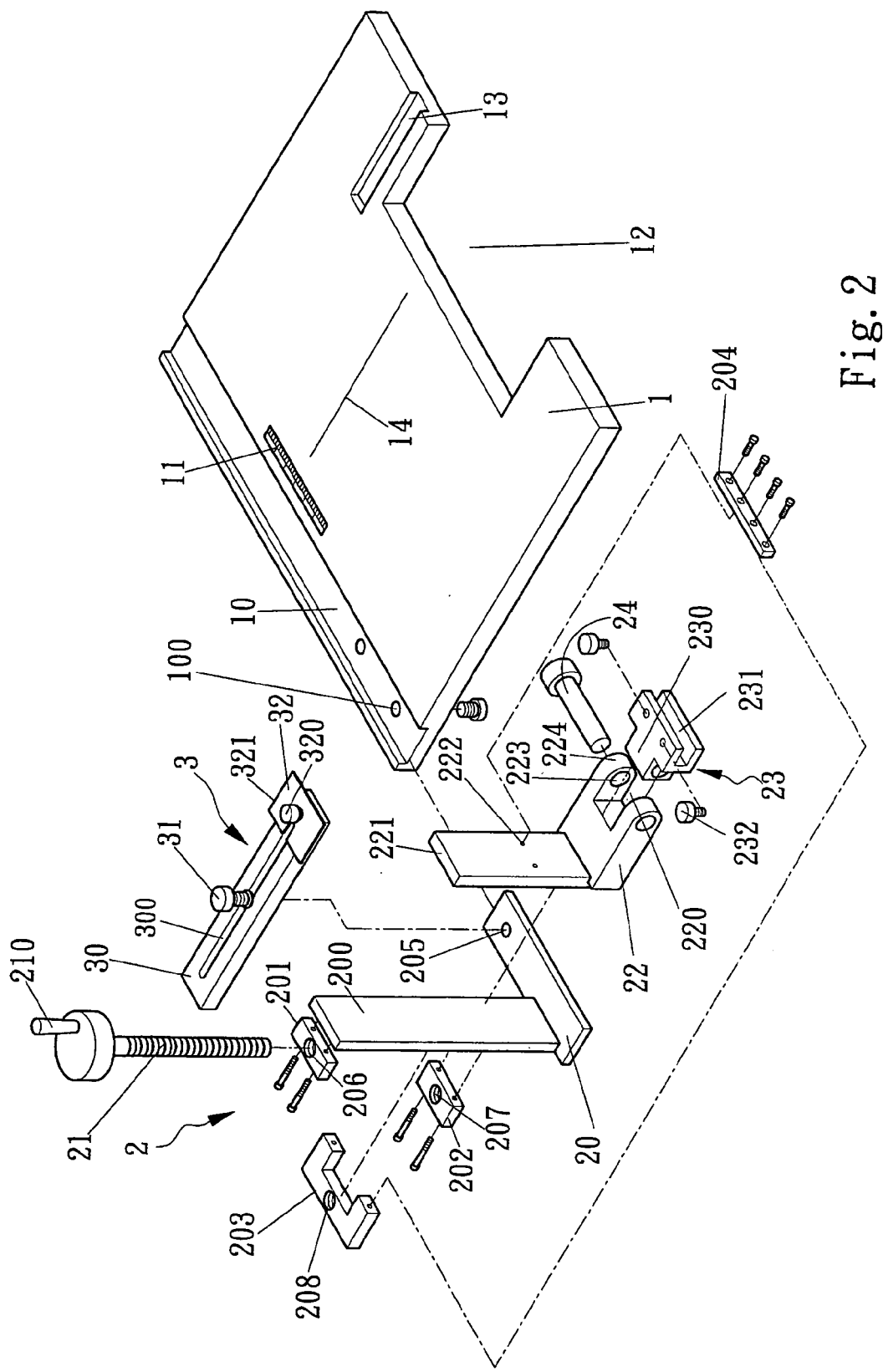
FIG. 2 is an exploded view of the adjustable measuring base according to the present invention.
Figure 3:
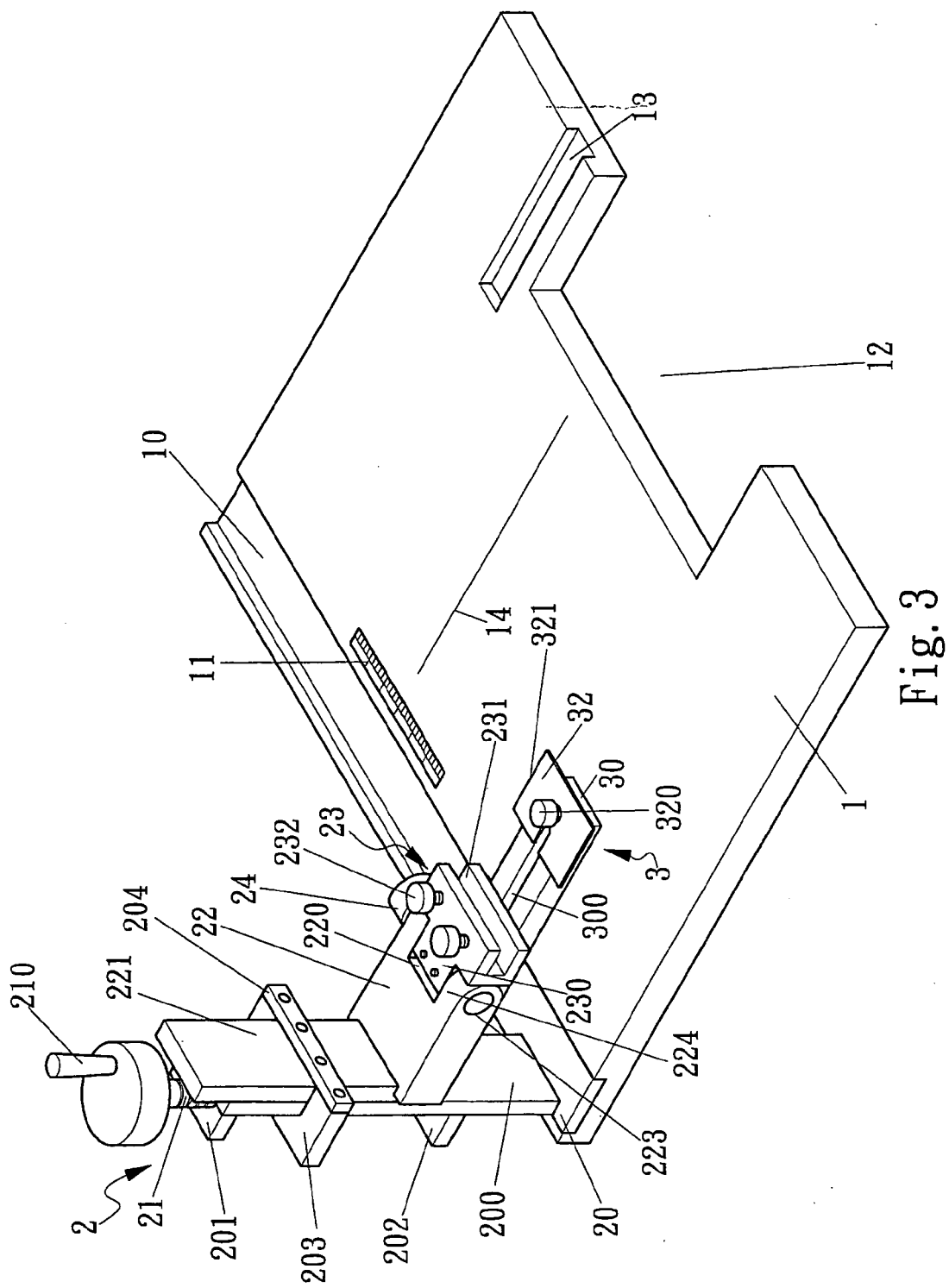
FIG. 3 is a perspective view of the adjustable measuring base according to the present invention.
Figure 9:
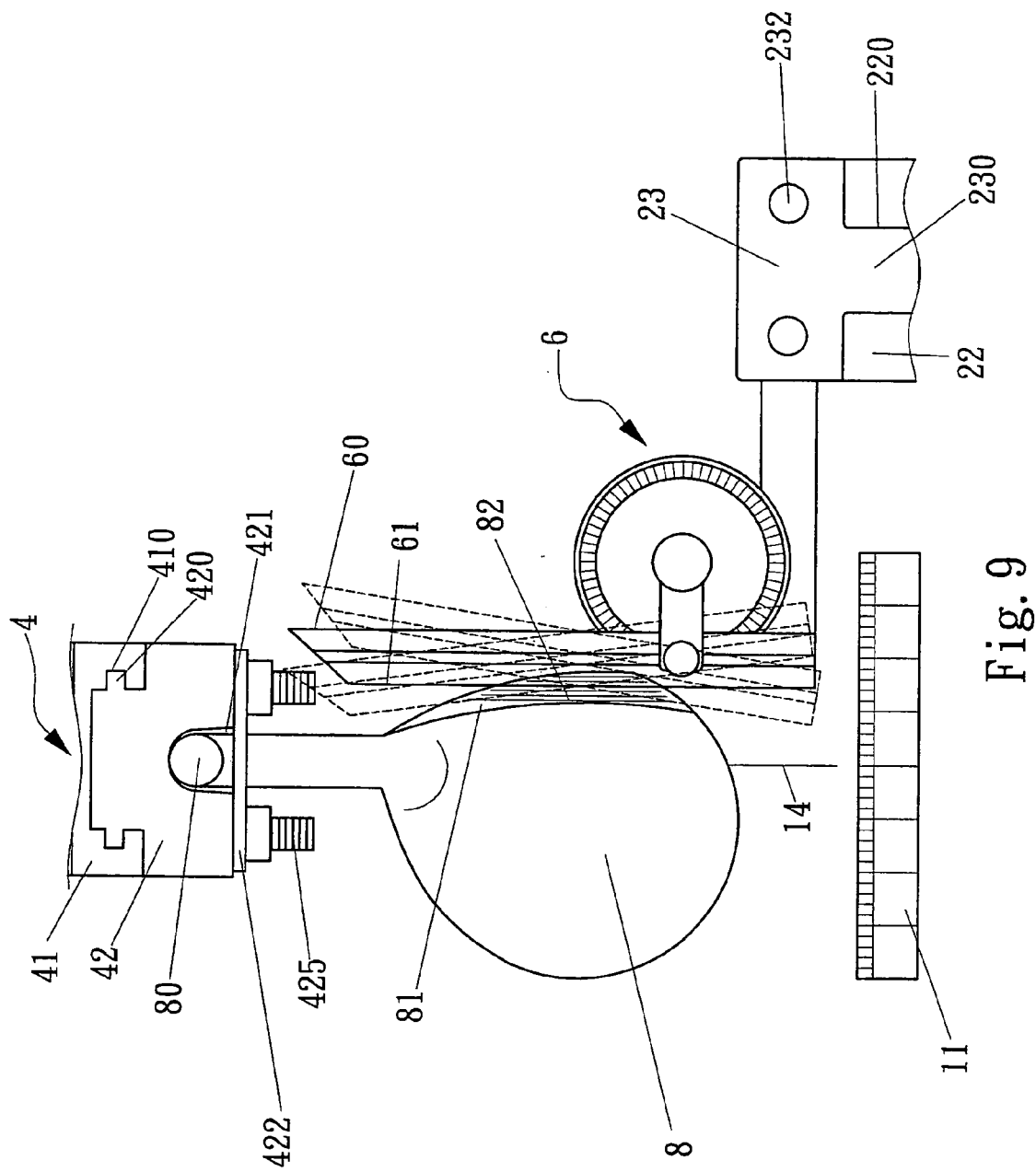
FIG. 9 is a view of measuring the face angle of the clubhead of an iron club according to the present invention.

The adjustable measuring base 2 (as shown in FIGS. 2 and 3) has an erect board 200 extended from one side of the fixed member 20 at the bottom of the adjustable measuring base 2. An upper board 201 and a lower board 202 are secured on one side of the erect board 200. An adjusting member 203, 204 is disposed each at the center of the upper board 201 and the lower board 202 respectively, and a screw hole 206, 207, 208 is disposed on the upper board 201, lower board 202, and adjusting member 203, 204 for receiving a screw rod 21 with a handle 210, and being rotated selectively in a clockwise direction or a counterclockwise direction to drive the adjusting member 203, 204 to move up or down. A pivotal member 22 is coupled to another side of the erect board 200 and an end section 224 having a through hole 223, and a channel 220 embedded into an embedding member 230 of a positioning member 23. An axle 24 passes into the through hole 223 of the end section 224 to define a fulcrum, so that a fixed groove 231 is disposed at one end and the positioning member 23 movably coupled to a screw 232 that can be rotated upward, and a plate member 221 extended from the rear end of the pivotal member 22, and a screw hole 222 disposed on the plate member 221 for moving the adjusting member 203 up and down to fix the protractor for measuring woods or irons, and facilitate the measurement of the face angle of the wood 7 of the golfclub 70 (FIG. 5) or iron 8 (FIG. 9). Further, the fixed member 20 is fixed into the channel 10 of the base 1, and a screw hole 205 is disposed on one end of the fixed member 20 for mounting an assistant measuring base 3 by screws.

The assistant measuring base 3 comprises a long block 30 having a long channel 300 for adjusting the screw hole 205 disposed on the fixed member 20 back and forth by a fixing screw 31, and a measuring board 32 positioned by a positioning rod 320 is fixed on the upper front end of the assistant measuring base 3, and the measuring board 32 at one side has a standard side 321.

Figure 4:
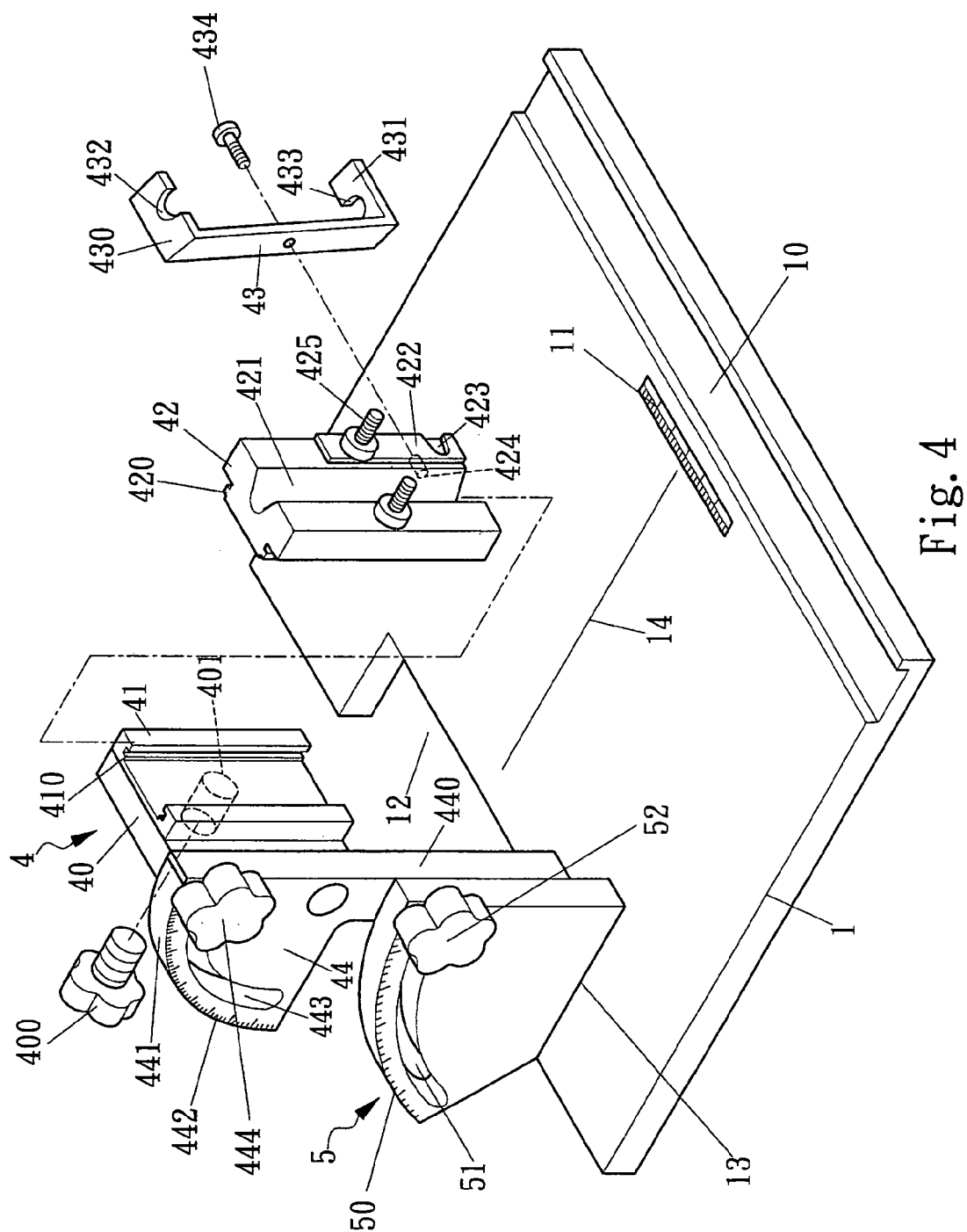
FIG. 4 is an exploded view of the fixed base and movable base according to the present invention.

The fixed base 4 (as shown in FIG. 4) is coupled to the front end of a link member 40 having a screw hole 401, and a screw rod 400 is screwed into the screw hole 401 and coupled to a connecting member 41 by a screw thread. An embedding groove 410 is disposed inside the connecting member 41 and engaged with an embedding member 420 with a shape corresponding to that of the embedding groove 410 is protruded from the rear end of an engaging member 42. A V-shaped groove 421 is disposed at the center of a front end of the engaging member 42 and a latch member 422 having a latch groove 423 for being pivotally coupled at each end by a screw bolt 425. A screw hole 424 is disposed at one end of the side of the engaging member 42 for mounting a positioning member 43 by a screw 434. A protruded edge 430, 431 is extended vertically from both sides of the positioning member 43 respectively, and such two protruded edges 430, 431 have a hanger 432 and a latch section 433 disposed in opposite directions corresponding to the hanger 432, so that the wood 7 is hung onto the hanger 432 and another corresponding latch section 433 is latched to prevent the wood 7 of the golfclub 70 from moving up and down. Further, a protruded base 440 having an adjusting base 44 is coupled to the engaging member 40 on the other side by screws. An arc side 441 having a quarter of the circumference is disposed at the top of the adjusting member 44, and a calibration 442 is marked on the edge of the arc side 441 and has an arc groove hole 443 with the same curvature as that of the arc side 441. A screw rod 444 of the adjusting base 44 is used to move the fixed base 4 along the arc groove hole 443, so that the wood 7 or iron 8 of the golfclub is clamped in a position for measuring its lie angle, and a movable base 5 is fixed on one side of the protruded base 440 by screws.

A calibration 50 is disposed on one side of the movable base 5, and an arc groove 51 with the same curvature as that of the movable base 5 is evacuated from the movable base 5. In the meantime, the protruded base 440 of the adjusting base 44 is rotated to a measuring lie angle and fixed into a position by a screw rod 52.

With the foregoing components, a fixed base 4 capable of being rotated along a circumference, an adjustable measuring base 2 for fixing a protractor 6 and allowing the protractor 6 to move in an increasing angle or a decreasing angle with respect to the adjustable measuring base 2, and an assistant measuring base 3 having a standard side are coupled separately to a base 1 with a horizontal flat surface. Since the protractor 6 is disposed on the adjustable measuring base 2, the face angle of the clubhead can be adjusted to match the measuring angle, thus achieving the purpose of reducing errors in measurement and improving precision.

Further, the sole surface of the wood 7 or the iron 8 is attached flatly on the horizontal base 1 to collocate with the left or right rotation of the fixed base 4, adjust the angle of measurement for the clubhead structure and achieve the expected precision.

Figure 5:
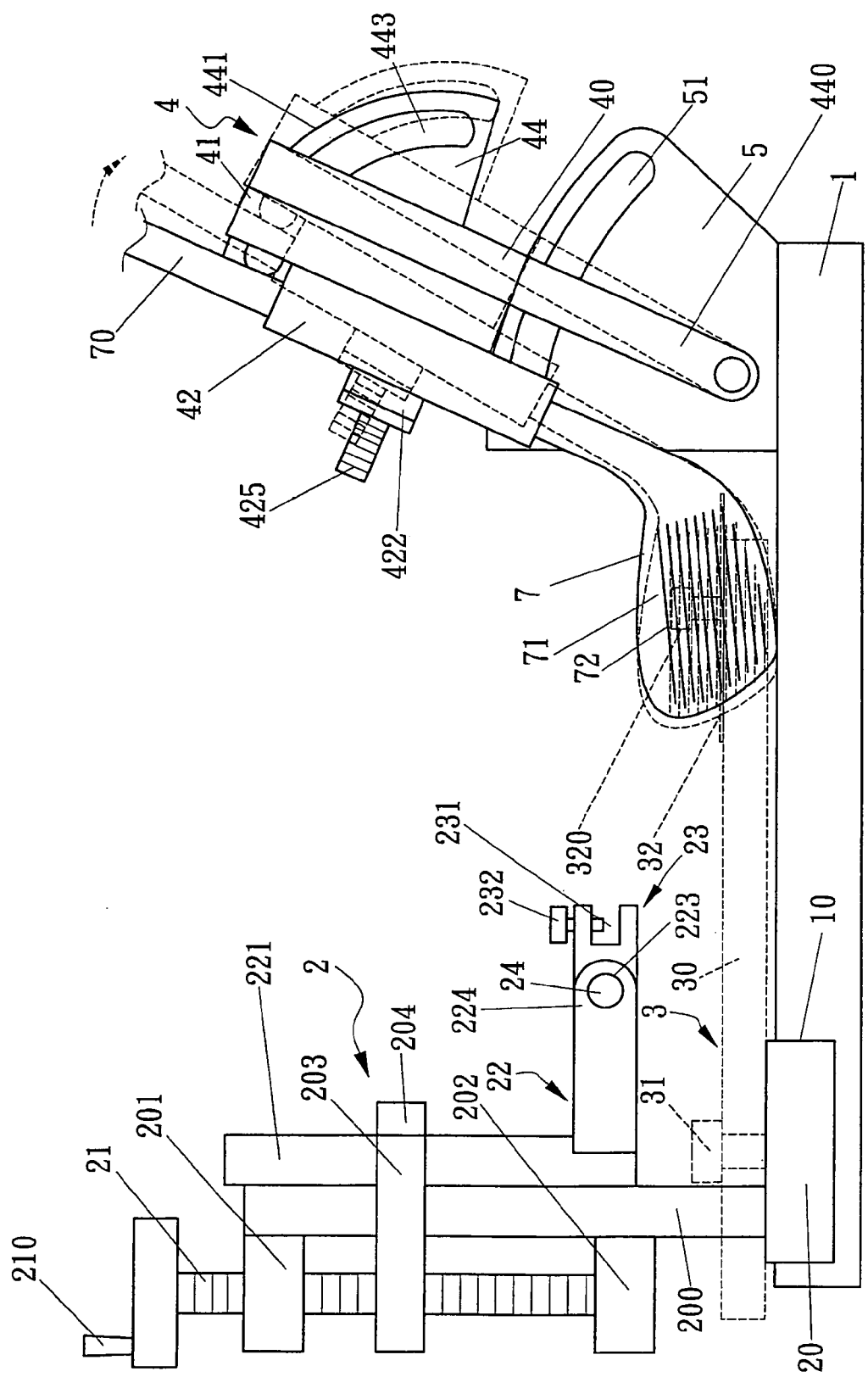
FIG. 5 is a view of the measuring lie angle according to the present invention.
Figure 6:
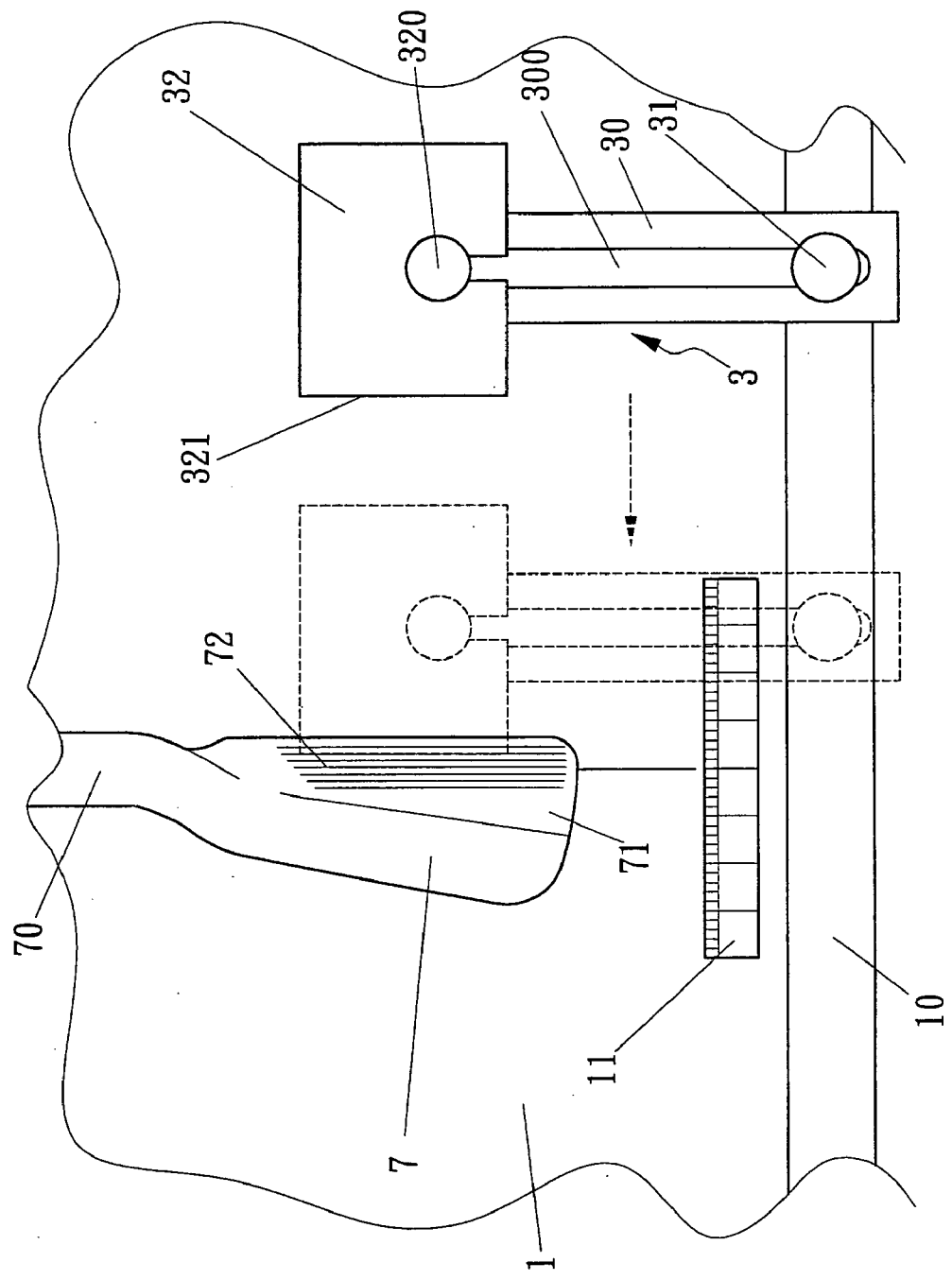
FIG. 6 is another view of the measuring lie angle according to the present invention.

Please refer FIGS. 5 and 6 for the procedure of measuring a lie angle according to the measuring method of the present invention. Firstly, the clubhead 7 of the golfclub 70 is placed into a V-shaped groove 421 of the engaging member 42 and fixed by a latch member 422. Then, an edge of the testing board 32 on the long block 30 of the assistant measuring base 3 is used to press against the transversal groove 72 on the striking face 71 of the wood 7. If they do not match, then the golfclub 70 is moved downward along the arc groove hole 443 by the engaging member 42 until the edge of the testing board 32 matches with the transversal groove 72 for the pressing. A user can obtain the angle of elevation measured by the calibration 442 on the arc side 441.

Figure 7:
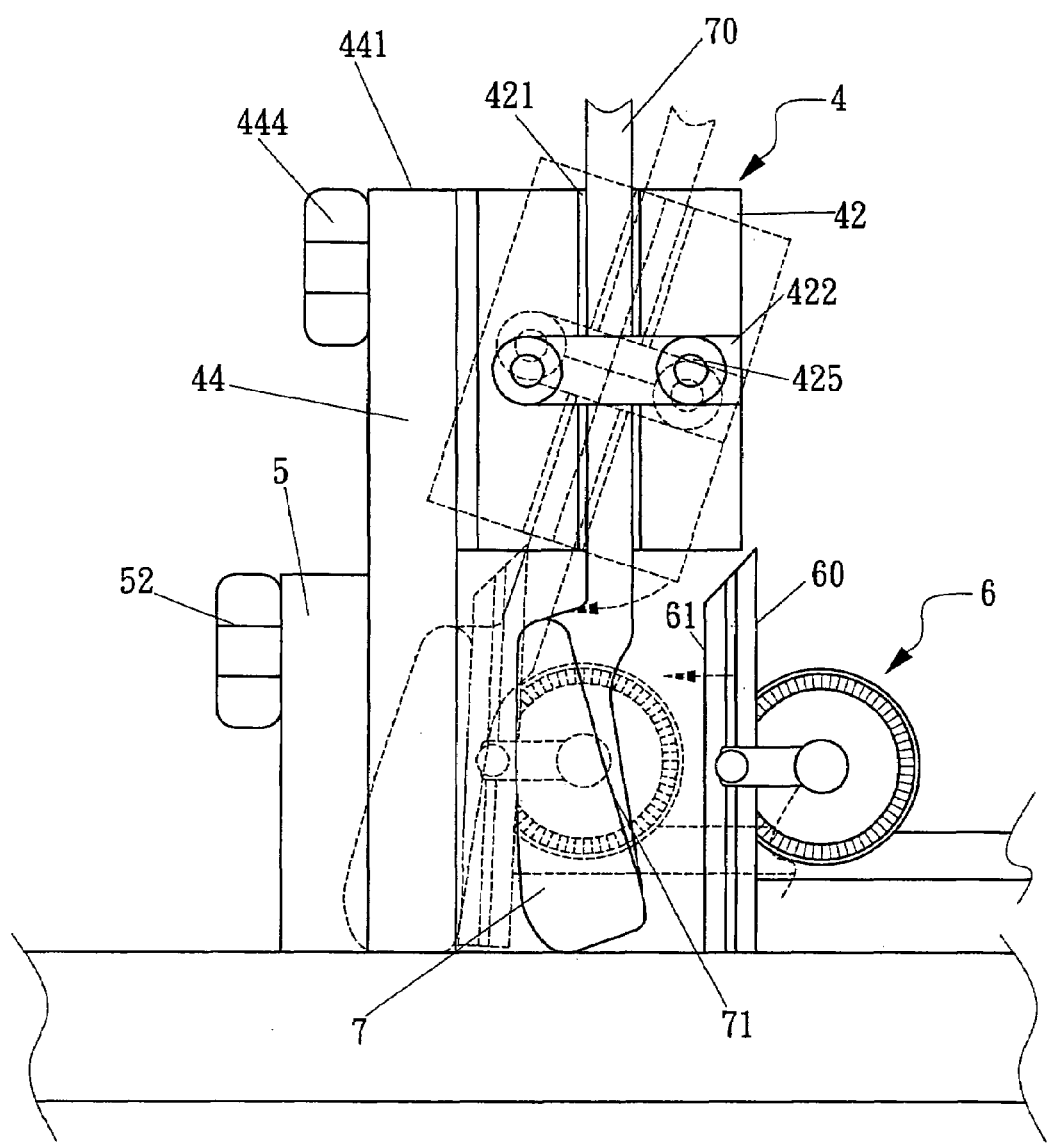
FIG. 7 is a view of measuring the sole angle of a clubhead of a wood according to the present invention.

Please refer to FIG. 7 for the view of the action taken for measuring the sole angle of the wood 7. Firstly, the wood 7 is fixed to the engaging member 42 by the golfclub 70, and the engaging member 42 has a rotary axis at its center and is fixed by a screw rod 400, such that the engaging member 42 can rotate to drive the wood 7 thereon to attach the sole of the wood 7 flatly on its horizontal surface, and then the protractor 6 fixed onto the outer side of the measuring board 61 of the assistant measuring base 3 is rotated and positioned vertically to prop up directly onto the striking face 71. The measured sole angle can be obtained from the protractor 6.

Figure 8:
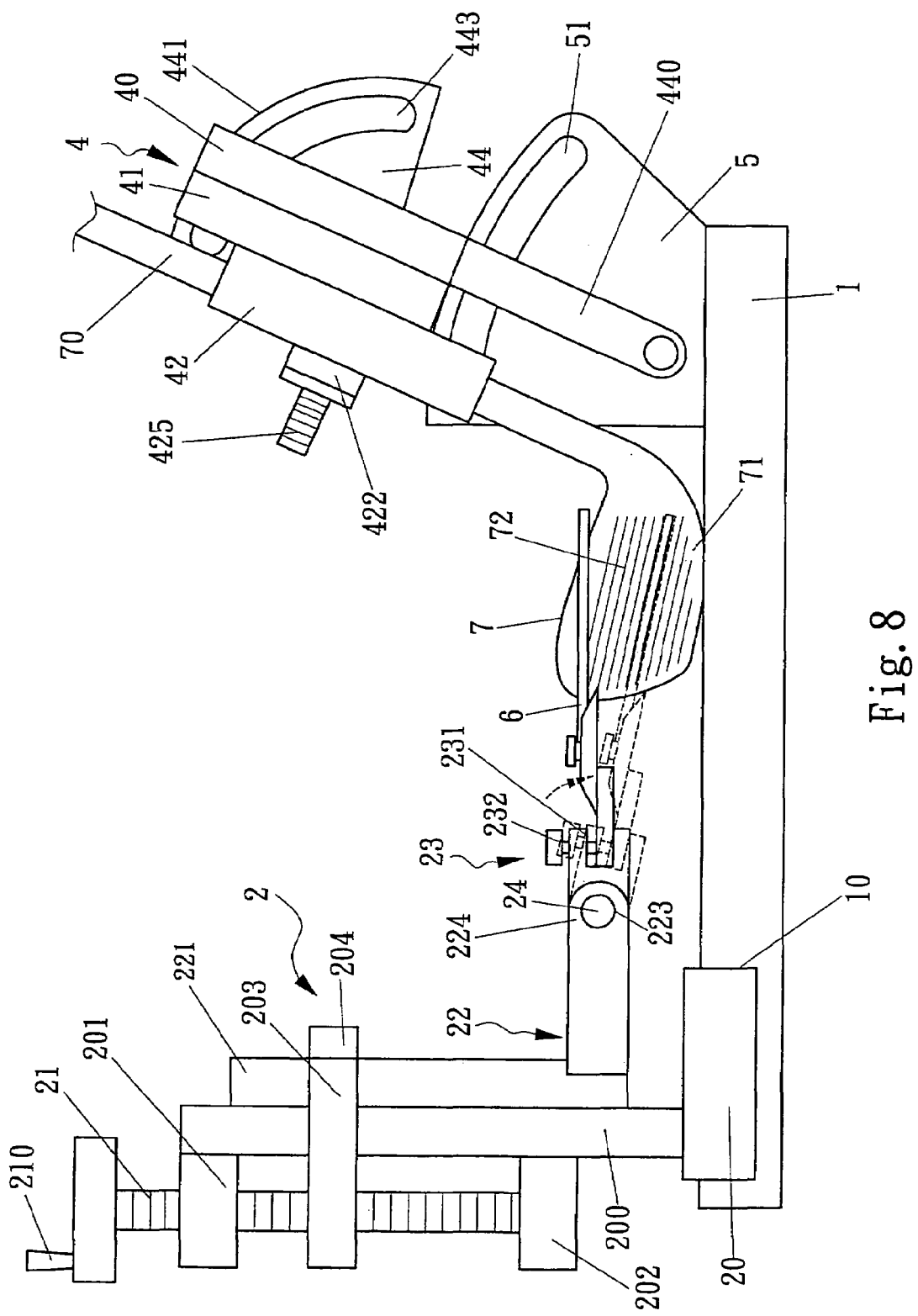
FIG. 8 is a view of measuring the face angle of the clubhead of a wood according to the present invention.

Please refer to FIG. 8 for measuring the face angle of a wood 7 (or FIG. 9 for the iron 8). Similarly, the wood 7 or the iron 8 is placed onto the base 1 by the engaging member 42, and the protractor 6 movably coupled to the pivotal member 22 of the adjustable measuring base 2 is adjusted to the same angle as that of the transversal groove 72 on the striking face 71 of the wood 7 (or transversal groove 82 of the striking face 82 of the iron 8), and presses the striking face 71, (81). The measured face angle can be obtained from the protractor 6.

Figure 10:
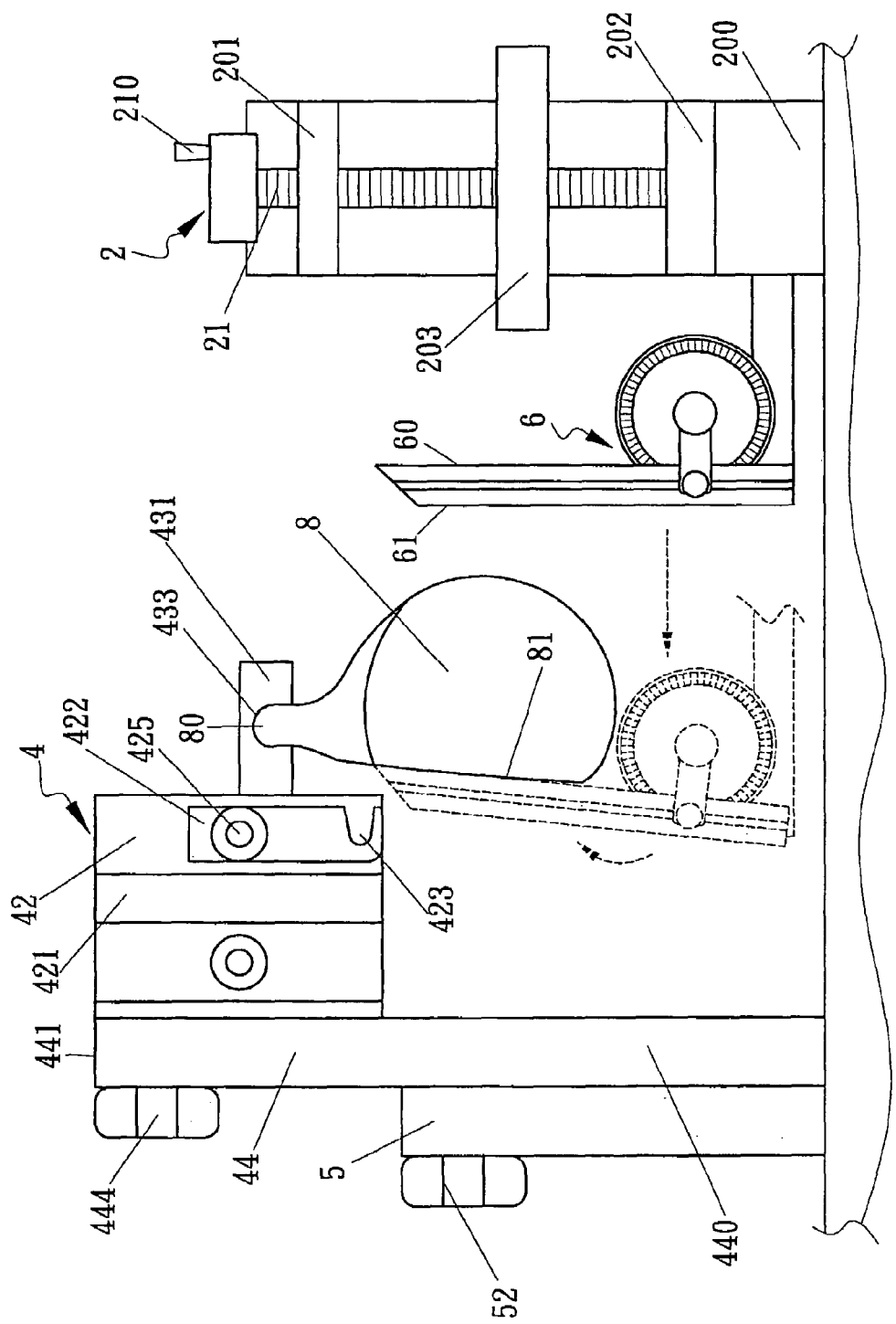
FIG. 10 is a view of the operation for measuring the gravity angle of the clubhead of an iron according to the present invention.
Figure 11:
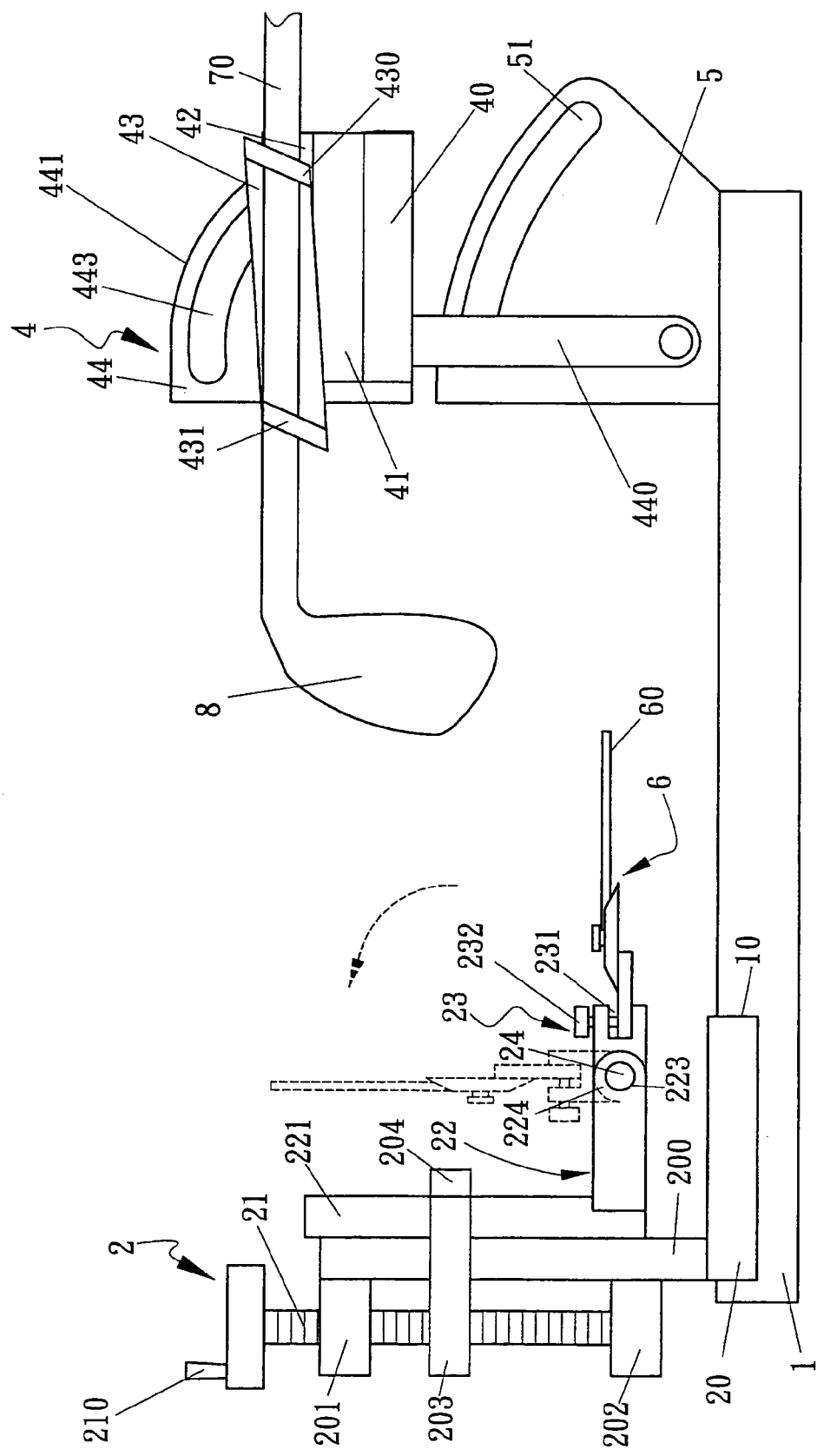
FIG. 11 is a view of the operation for measuring the gravity angle of the clubhead of a wood according to the present invention.

Please refer to FIG. 10 for measuring the gravity angle of a clubhead using the present invention. Firstly, an iron 8 (or a wood 7 as shown in FIG. 11) is fixed to a hanger 432 and a latch section 433 disposed correspondingly in opposing directions on two protruded edges 430, 431, so that the club 80 is placed horizontally and the iron 8 droops naturally. Then, the protractor 6 movably couples to the pivotal member 22 of the adjustable base 2 and rotates to a vertical fixed position, pressing the inner side 60 of the measuring board against the striking face 81 of the iron 8. The measured gravity angle of the striking face can be obtained from the protractor 6.

Figure 12:
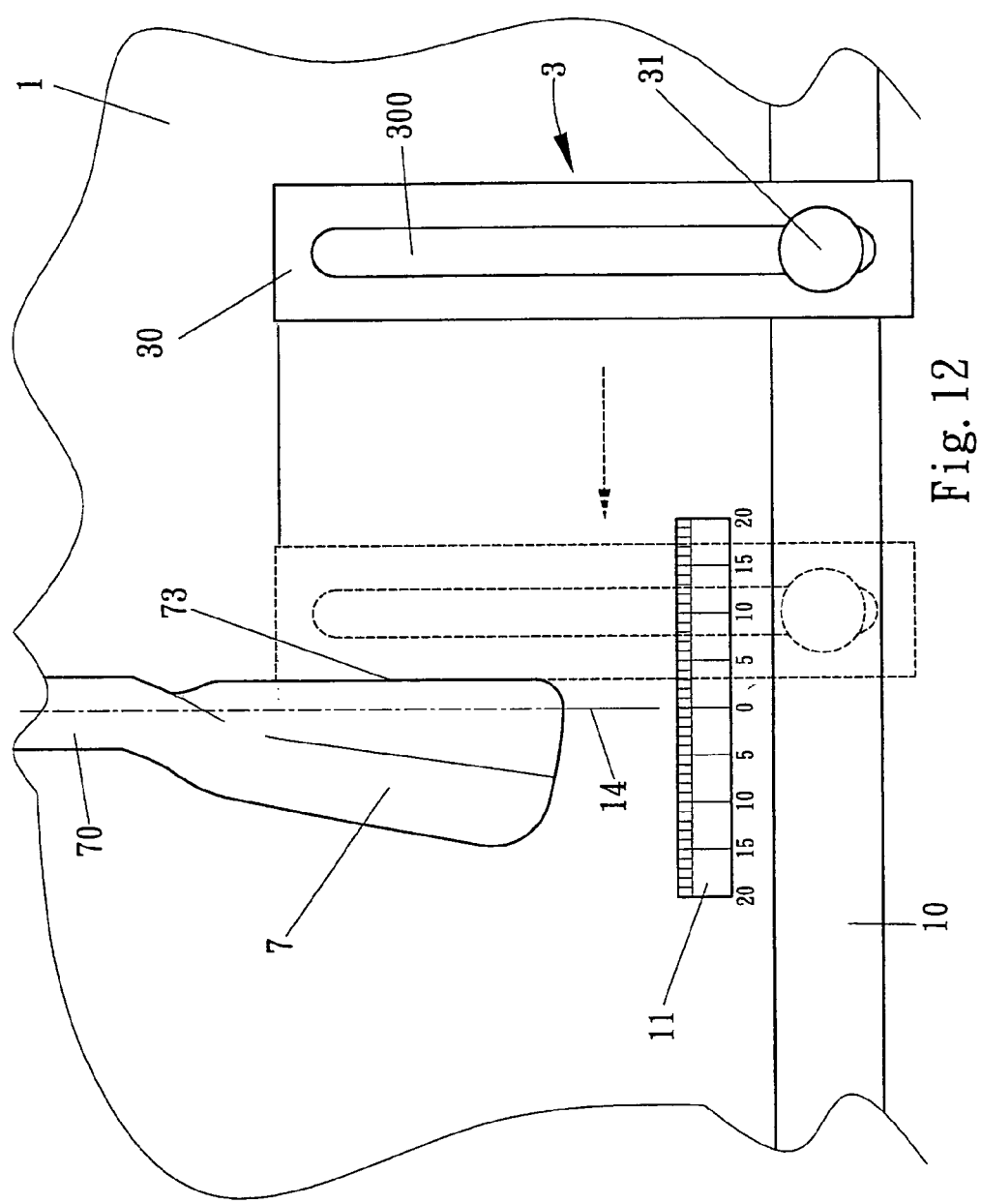
FIG. 12 is a view of measuring the face and center of a golfclub according to the present invention.

Finally, refer to FIG. 12 for measuring the progression of the center of a club with the present invention. The wood 7 is fixed by aligning the center of the club with a standard line 14 on the base 1, and then the long block 30 of the assistant measuring base 3 presses against the end surface 73 of the striking face directly. The measured progression of the center of the club can be obtained from the calibration.

What is claimed is:

1. A club head measuring gauge for measuring various angles of a golf club comprising:

a) a horizontal base;
b) an adjustable measuring base slidably connected to the horizontal base and having:
   i) a pivotal member;
   ii) a screw rod being selectively rotatable in clockwise and counterclockwise directions and controlling an upwardly and downwardly movement of the pivotal member; and
   iii) a protractor pivotally connected to the pivotal member and movable upwardly and downwardly to a predetermined position by rotation of the screw rod;
c) an assistant measuring base located on the adjustable measuring base; and
d) a fixed base connected to the horizontal base opposite the adjustable measuring base, the golf club is connected to the fixed base and is pivotally, slidably, and rotatably adjustable therein relative to the horizontal base.

2. The club head measuring gauge according to claim 1, wherein the adjustable measuring base has a positioning member pivotally connected to the pivotal member, and the protractor is connected to the positioning member.

3. The club head measuring gauge according to claim 2, wherein the positioning member has a fixed groove and a screw, and the protractor is inserted into the fixed groove and connected to the positioning member by the screw.

4. The club head measuring gauge according to claim 1, wherein the fixed base comprising:
   a) a link member;
   b) a connecting member rotatably connected to the link member;
   c) an engaging member slidably connected to the connecting member; and
   d) a positioning member connected to the engaging member.

5. The club head measuring gauge according to claim 4, wherein the fixed base comprising:
   a) an adjusting base pivotally connected to the link member; and
   b) a movable base pivotally connected to the adjusting base.

6. The club head measuring gauge according to claim 1, wherein the assistant measuring base comprising:
   a) a long block slidably connected to the adjustable measuring base; and
   b) a measuring board connected to an end of the long block.

7. The club head measuring gauge according to claim 6, wherein the measuring board has a standard side.

* * * * *